UNITED STATES PATENT OFFICE.

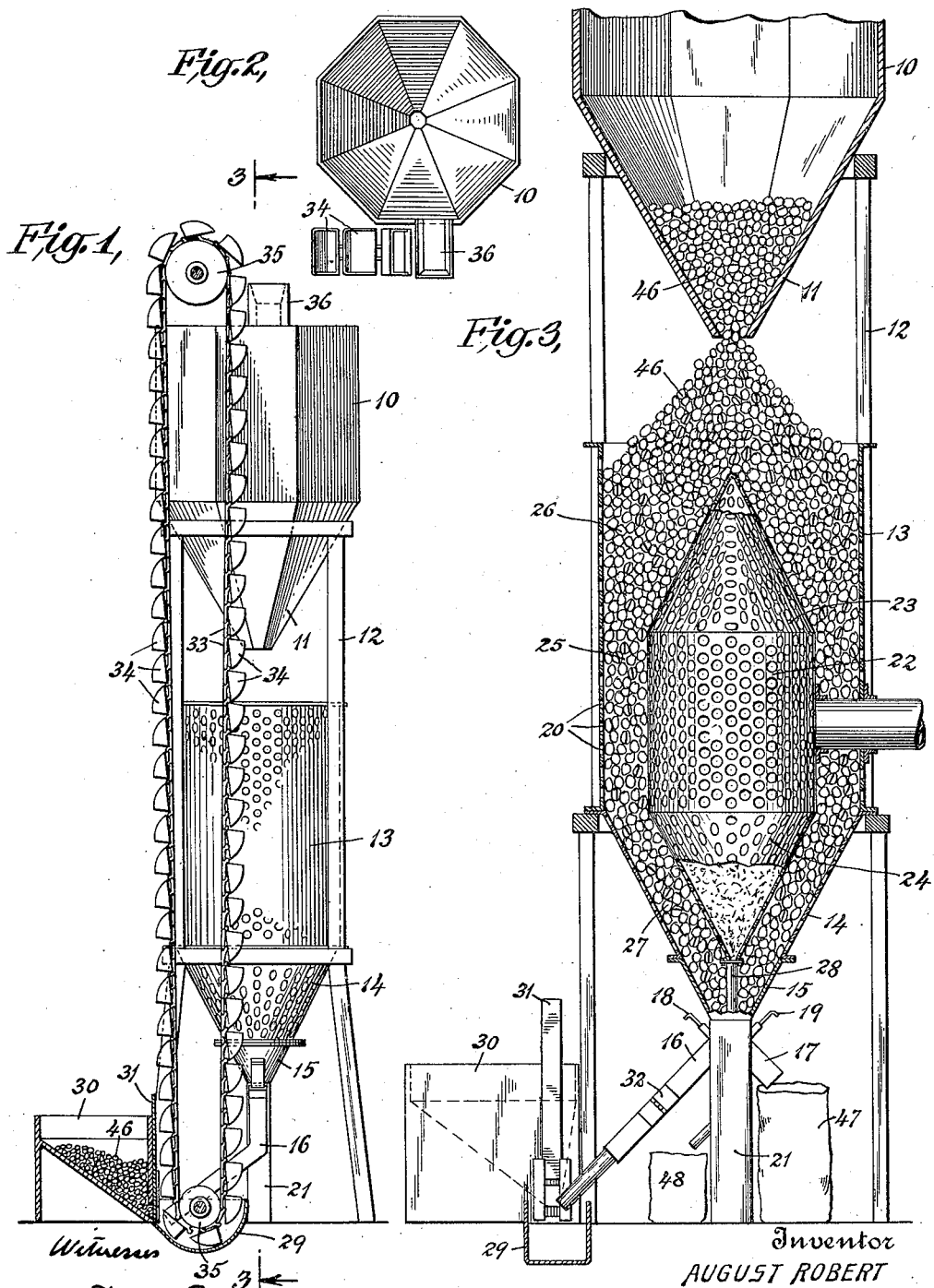

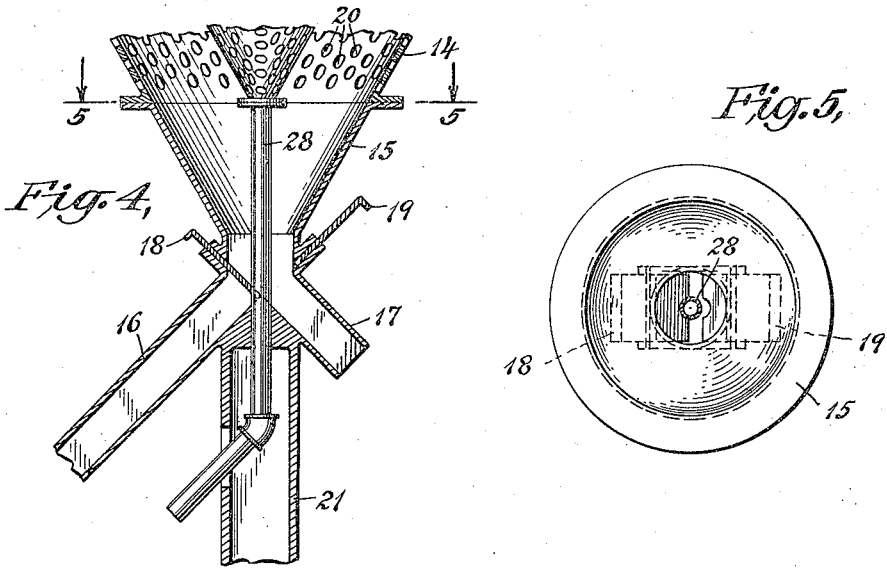
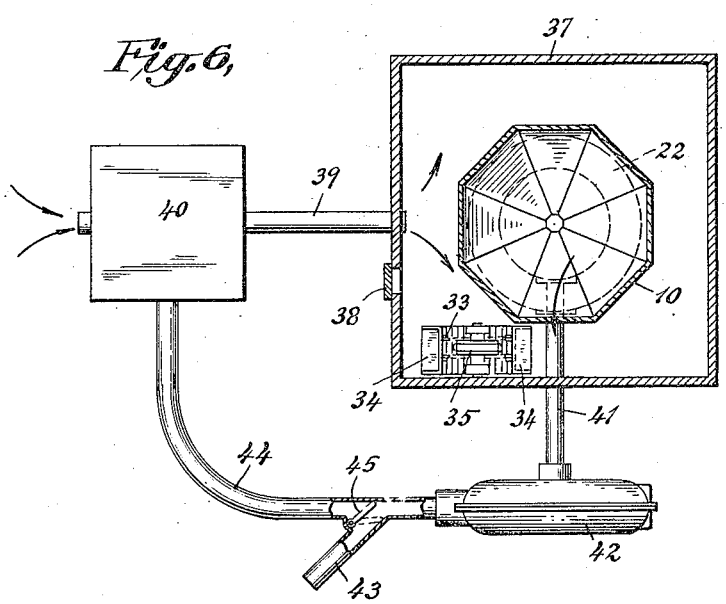

AUGUST ROBERT, OF COATEPEC, MEXICO, ASSIGNOR TO CARLOS L. POLANCO, OF COATEPEC, VERACRUZ, MEXICO.

APPARATUS FOR TREATING COFFEE.

1,341,676. Specification of Letters Patent. Patented June 1, 1920.

Application filed December 13, 1918. Serial No. 266,612.

*To all whom it may concern:*

Be it known that I, AUGUST ROBERT, a citizen of Switzerland, and resident of Coatepec, VeraCruz, Mexico, have invented certain new and useful Improvements in Apparatus for Treating Coffee, of which the following is a specification.

My invention relates to apparatus for treating coffee. In preparing coffee for the commercial markets, the coffee berries, after having been picked, are passed, for instance, through a suitable machine whereby the coffee beans contained in said berries are liberated. These liberated beans are then permitted to ferment in the usual way and are then washed in the customary manner so that at this stage said beans are wet and moist; in order that the beans may be properly hulled, it is desirable and even necessary to dry said beans and to remove substantially all extraneous moisture therefrom prior to the introduction of said beans into the huller. The particular object of my invention is to provide a simple apparatus whereby the removal of said moisture from said beans may be accomplished in an economical manner with a minimum of labor and in a relatively short period of time. Other more specific objects will appear from the description hereinafter, and the features of novelty will be pointed out in the appended claims.

In the accompanying drawings, which for illustrative and descriptive purposes show an example of my apparatus, Figure 1 is an elevation partly in section; Fig. 2 is a plan view; Fig. 3 is a detail section on an enlarged scale in the line 3—3 of Fig. 1; Fig. 4 is an enlarged detail section of the discharge end of the apparatus; Fig. 5 is a horizontal section on the line 5—5 of Fig. 4; and Fig. 6 is a diagrammatic plan view, partly in sections, illustrating a complete installation of the apparatus.

In utilizing my invention, the beans inclosed in the parchment covers and initially in a wet or moist condition, are circulated in a constant path, preferably in a closed chamber, in the presence of a drying agent, such as heated air, and preferably subject to the effects of suction whereby the heating agent is brought into intimate contact with the beans and the moisture is carried away. In the preferred form the above process is performed in such a manner, that the circulation of the beans is in general vertical directions.

The apparatus illustrated in the accompanying drawings is designed to economically and efficiently carry out said process. As shown, the apparatus comprises a hopper 10 having a downwardly converging outlet spout 11, said hopper 10 being supported at the desired height, for instance, upon a suitable supporting frame 12, as shown in Fig. 1. The latter carries also a vertical receptacle 13 open at its upper end, and having a downwardly converging spout 14 which, in the illustrated example, rests upon and communicates with a continuing section 15; the latter is provided with outlet spouts 16 and 17 independently controlled in any suitable manner, as by means of gates or valves 18 and 19 respectively. In the preferred form, the receptacle 13 is perforated as indicated at 20, and is located upon the frame 12 beneath and in substantial axial registry with the outlet spout 11 of the hopper 10. A hollow standard or equivalent device 21 may extend between the section 15 and the surface upon which the frame 12 rests, for the purpose of increasing the rigidity of the apparatus.

A preferably perforated hollow member 22, corresponding in shape to the interior form of the receptacle 13, is located within the latter and at its upper end is provided with an upwardly converging continuing section 23 while its lower end communicates with a downwardly converging, continuing section 24, both sections 23 and 24 being preferably also perforated as shown in Fig. 3. The member 22 and its continuing sections 23 and 24 are of such dimensions and are so located within the receptacle 12, as to form the annular chamber 25 and the annular chambers 26 and 27 forming continuations thereof at opposite ends; the chambers 25 and 27 may be of substantially the same width, while the chamber 26 diverges upwardly because of the upright surface of the receptacle 12 and the converging surface of the section 23 as shown in Fig. 3. In the operative condition of the apparatus, the apex of the section 23 is preferably located in approximate axial registry with the spout 11 of the hopper 10. An outlet pipe 28 communicates with the interior of the section 24, and extends through the standard 21 and exteriorly thereof as shown in Fig. 4 for the purpose to be more fully described hereinafter.

The outlet spout 16 leads from the continuing section 15 to a trough or the like 29 located in coöperative relation to a receiving bin or the like 30, the exit of the latter and its communication with said trough 29 being controlled in any convenient way as by means of a slide or the like 31 as shown in Figs. 1 and 3. If desired, the spout 16 may be provided with a door 32 capable of being opened when it is desired, for instance, to inspect the interior of said spout for any reason.

A chain belt or equivalent device 33, carrying buckets 34, travels over sprockets or pulleys 35 journaled in suitable bearings and is so arranged as to cause the buckets 34 to travel transversely into and through the trough 29 and upwardly into dumping relation with a chute 36 leading to the hopper 10, as shown in Figs. 1 and 2. It will be understood that suitable driving mechanism is provided, whereby said chain belt or the like and the buckets 34 are actuated.

The apparatus so far described is generally set up and contained in a closed room or chamber 37 to which access may be had, for instance, by means of a door 38, as shown in Fig. 6. Any suitable drying agent may be introduced into this room 37 in any convenient manner; for instance, as illustrated in Fig. 6, said room 37 may be connected, by means of a pipe 39, with a heater 40, whereby heated air is conveyed to said room or chamber 37. In the preferred construction the member 22 is connected by means of a pipe 41 with a suitably operated suction device 42 which communicates with the atmosphere by means of a pipe 43, and is connected also with the heater 40 through the medium of pipe 44. A valve or gate 45 is located at the junction of the pipes 43 and 44, and serves to control the communication between the suction device 42 and the atmosphere and between said device 42 and the heater 40, it being understood that suitable means is provided for readily manipulating said valve or gate 45. In the preferred arrangement, the heater 40 and the suction device 42 are located exteriorly of the room or chamber 37, although this is not absolutely necessary, it being obvious that the desired results may be obtained with equivalent arrangements.

In utilizing the apparatus, the beans 46, after having been washed as hereinbefore mentioned, are introduced into the receiving bin 30 in the desired quantity, and in the moist or wet condition incident to said beans, immediately subsequent to their separation from the berries. The chain belt 33, or its equivalent, is set in motion through the medium of the aforesaid suitable actuating mechanism, to cause the buckets 34 to move upwardly on the one run, and downwardly on the other in the well known way, and at the same time the heater 40 and suction device 42 are started in any convenient and well known way.

When the running parts of the apparatus are in full operation, the slide 31 is raised whereby the beans 46 contained in the bin 30 are caused to pass into the trough 29; as the buckets 34 successively pass into and transversely through said trough, the beans therein are scooped up and carried upwardly by said buckets and are finally dumped into the chute 36 from which said beans pass into the hopper 10. From the latter the beans 46 drop by way of the spout 11 upon the upwardly converging section 23 and are distributed thereby into the annular chambers 26, 25 and 27, it being understood that the gates 18 and 19 are meanwhile both closed. The described operation may continue until the supply of beans 46 has been transferred from the bin 30 to the receptacle 13 or until the member 22 and its continuing sections 23 and 24 are completely buried in the beans, for instance as shown in Fig. 3. At the proper time the gate 18 is opened which permits the beans 46 to pass from the chamber 27 through the spout 16 back to the trough 29 from which said beans are again scooped up by the buckets 34 and passed up again to the chute 36 and hopper 10, said beans finally again passing from the spout 11 back to the spaces 26, 25, and 27. Thus as long as the gate 18 is open the beans will circulate in a continuous path and will pass from the trough 29 to the hopper 10 and to the spaces 26, 25 and 27 and back again to said trough.

During the time the beans are located in the spaces 26, 25 and 27 they are subjected to the effects of the drying medium, in the present case heated air and to the effects of the suction device, 42. The latter not only serves to draw the heated air into the chamber 37 and through the perforations of the receptacle and over and in contact with the beans 46 but it also withdraws a great part of the moisture therefrom, which moisture passes out through the pipe 43 to the atmosphere, it being understood that the gate 45 is in the position shown in Fig. 6. As soon as the major portion of the moisture has been thus withdrawn the gate 45 is actuated to close the pipe 43 and to open the pipe 44 whereupon the suction device 42 sucks the heated air through the perforations 20 and over the beans 46 as before and passes it back to the heater 40, thus avoiding a waste of heated air and reducing the cost of operation of the heater to a minimum.

Owing to the fact that the capacity of the spout 16 is less than that of the space 27, the speed at which the beans descend in the receptacle 13 is relatively slow; at the same time an adequate supply of beans is always maintained at the top of the mass because the chambers 25, and 27 are of relatively less width than that of the chamber 26. The process is thus continuous and without interruption as long as the apparatus is in operation.

As the beans 46 reach the section 23 they are evenly distributed thereby to all parts of the chamber 25 and as said beans gradually pass downward into said chamber 25, the mass is spread out as it were into vertical layers, and retains this condition until the beans again pass through the spout 16 back to the trough 29. In this way all parts of the mass of beans and all parts of the individual beans are subjected to the full effects of the drying agent. The described circulation and operation of the apparatus may be continued as long as necessary and until the desired results have been obtained without requiring any special attention on the part of attendants.

When the desired degree of dryness has been attained the gate 18 is closed and the gate 19 is opened thus diverting the beans to the spout 17 and causing them to pass from the chamber 27 to suitable bags or other receptacles 47 in which said beans may be carried to the huller or other machines whereby the process of preparing the beans for commercial use is continued in the well known way.

During the operation of the apparatus the condition of the beans may be periodically inspected by way of the door 32 in the spout 16. The action of the suction device 42 also serves to withdraw a great portion of the dust and other foreign material combined with the beans; such dust and other foreign matter which is not removed by the suction device will drop to the section 24 by gravity and may be removed therefrom through the pipe 28 and collected in suitable bags or the like 48.

The above illustrated apparatus is extremely simple and efficient, and is economical in operation and eliminates the necessity for constant attention while at the same time reducing the period of operation and number of attendants required to a minimum. The apparatus by reason of its simplicity also reduces the cost of manufacture and installation materially below that of existing machines.

Various changes in the specific process described and in the specific form of apparatus shown and described may be made within the scope of the claims without departing from the spirit of my invention.

I claim:

1. An apparatus for treating coffee comprising a receptacle having an inlet and an exit, a perforated hollow member within said receptacle and having tapering end sections and a tubular intermediate section and a suction connection communicating with said hollow member.

2. An apparatus for treating coffee comprising a perforated receptacle having an inlet and an exit, a hopper located above and in registry with the inlet of said receptacle whereby coffee beans are fed thereto, means for delivering said beans to said hopper, a perforated hollow member having tapering end sections and a cylindrical intermediate section within said receptacle for distributing the beans therein, a conduit connected with said exit for removing said beans from said receptacle and for conducting them back to said delivering means whereby said beans are caused to pass through said receptacle in a substantially continuous mass, and means for drying said beans while passing through said receptacle.

3. An apparatus for treating coffee comprising a perforated upright receptacle having an inlet, a downwardly converging outlet section communicating with said receptacle, a hopper located above and in registry with said inlet whereby coffee beans are fed to said receptacle, a trough, a belt and buckets whereby said beans are removed from said trough and delivered to said hopper, a conduit connected with said outlet section for conducting said beans back to said trough whereby said beans are caused to pass through said receptacle in a downwardly moving substantially continuous mass, a hollow perforated member within said receptacle and forming therewith an annular chamber, a downwardly converging portion forming a continuation of said member within the outlet section of said receptacle and providing a continuing annular chamber therein, an upwardly converging section forming a continuation of said member whereby said beans are evenly distributed throughout said annular chambers, an outlet pipe connected with said downwardly converging section, a closed chamber inclosing said apparatus, means for supplying a drying agent to said closed chamber and a suction device connected with the interior of said hollow member.

In testimony whereof I have hereunto set my hand.

AUG. ROBERT.